L. P. BIGGERS.
PROPELLER.
APPLICATION FILED DEC. 5, 1916.
1,267,048.
Patented May 21, 1918.
2 SHEETS—SHEET 1
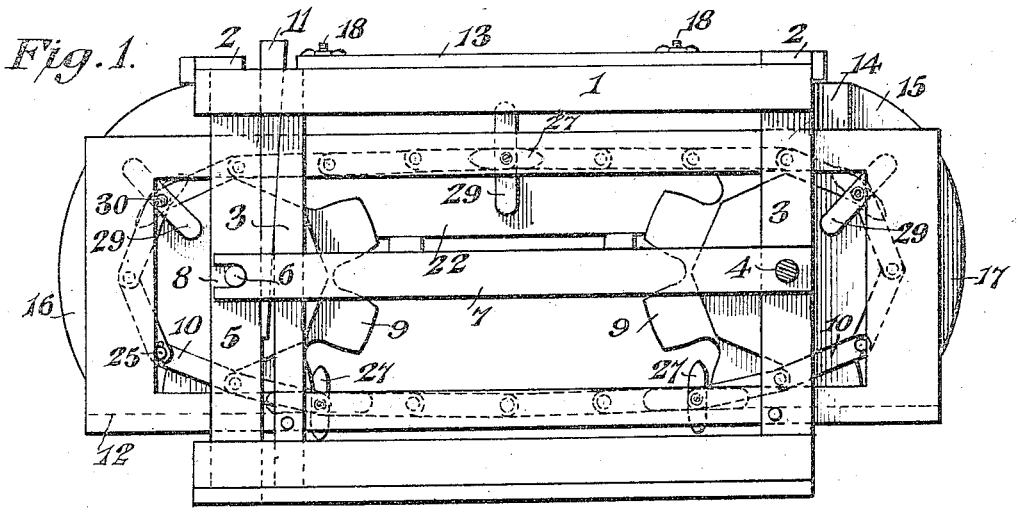
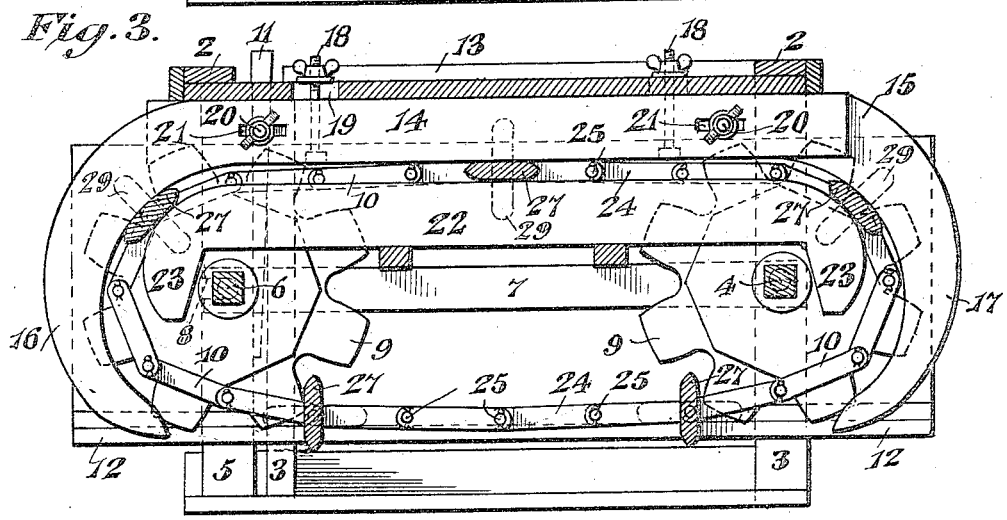
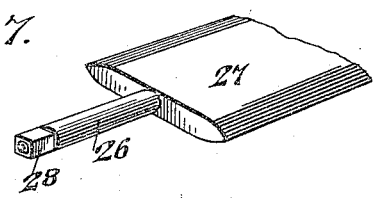
WITNESSES
Jas. K. McCathran
F. T. Chapman.
Lee P. Biggers, INVENTOR
BY  C. L. Biggers
ATTORNEY

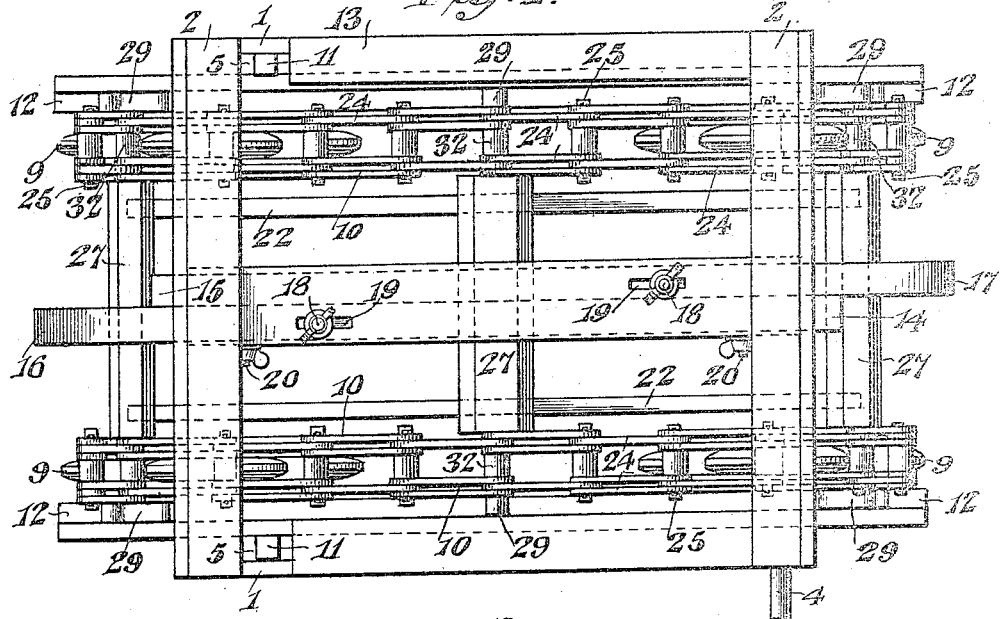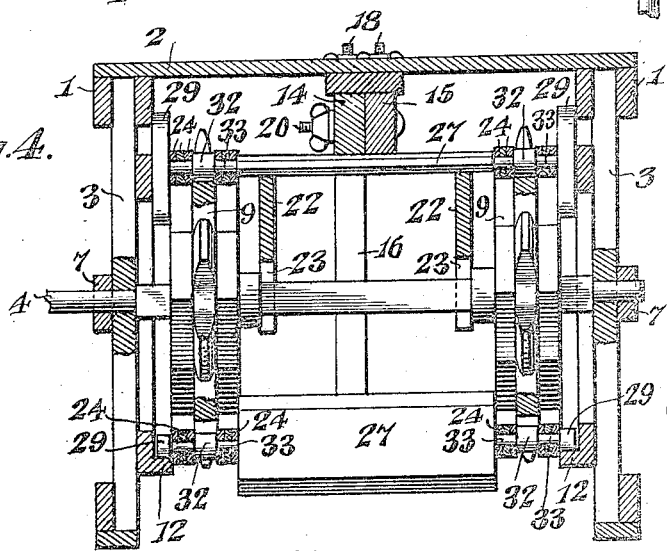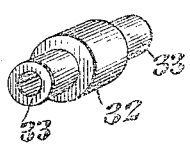

UNITED STATES PATENT OFFICE.

LEE PERKINS BIGGERS, OF PALMERSVILLE, TENNESSEE, ASSIGNOR OF ONE-TWELFTH TO JAMES M. PALMER, ONE-TWELFTH TO BEN. J. BYARS, ONE-TWELFTH TO CHARLES N. KILLGORE, ONE-TWELFTH TO LUTHER C. BRANN, ONE-TWELFTH TO CHESTER H. RAWLS, ONE-TWELFTH TO WALTER G. McWHERTER, ONE-TWELFTH TO WALTER L. LAFON, ONE-TWELFTH TO WILLIAM M. PENTECOST, ONE-TWELFTH TO LUCO L. OLDS, AND ONE-TWELFTH TO J. M. BUCKLEY.

PROPELLER.

1,267,048.  Specification of Letters Patent.  Patented May 21, 1918.

Application filed December 5, 1916. Serial No. 135,220.

*To all whom it may concern:*

Be it known that I, LEE P. BIGGERS, a citizen of the United States, residing at Palmersville, in the county of Weakley and State of Tennessee, have invented a new and useful Propeller, of which the following is a specification.

This invention has reference to propellers and its object is to provide a propeller of the feathering paddle wheel type, which is especially adapted for sea-going vessels.

In accordance with the present invention the propeller is provided with an endless series of blades or paddles mounted to turn about their longitudinal axes and having an orbital path of travel in the form of a flat ellipse. The paddles are mounted at their ends upon journal bearings carried by sprocket chains and the sprocket chains travel about sprocket wheels mounted to turn on axes corresponding to the axes of the ends of the ellipse. The upper run of the connected series of paddles is carried by sustaining means on which the paddles lie flatwise as they move along, while the lower run of the series of paddles is carried by end supports coöperating with members, on the ends of pintles with which the paddles are provided, acting to turn the paddles upright so as to present their faces flatwise toward the water in the direction of travel.

The paddle pintles are so mounted on the sprocket chains that they are free to turn about their longitudinal axes, while the guides for the upper and lower runs, which also act as supports for the chains and pintles, control the feathering of the paddles.

Power is applied to the structure to operate it and the paddle wheel or paddle wheels, where more than one is employed, have extended engagement with the water through which the vessel is traveling, so that the propelling power is correspondingly great.

The structure is such that wear may be readily taken up from time to time so that the parts always remain in proper relation.

The invention will be best understood from a consideration of the following detailed description, taken in connection with the accompanying drawings forming part of this specification, with the further understanding that while the drawings show a practical form of the invention the latter is not confined to any strict conformity with the showing of the drawings, but may be changed and modified so long as such changes and modifications come within the scope of the appended claims.

In the drawings:—

Figure 1 is a side elevation of a paddle wheel structure embodying the invention.

Fig. 2 is a plan view thereof.

Fig. 3 is a longitudinal vertical section of the structure.

Fig. 4 is an end elevation of the paddle wheel structure of Fig. 1 as seen from the right hand end thereof, with the blades differently positioned and some parts, including one end frame, in cross section.

Fig. 5 is a plan view of one end of one of the paddles with the bearing therein shown in section.

Fig. 6 is a perspective view of a bearing block for the pintle end of a paddle.

Fig. 7 is a detail perspective view of the end of one of the paddle blades.

Referring to the drawings, there is shown a supporting structure made up of longitudinal beams 1, cross beams 2 and upright posts 3 and other parts constituting the main frame of the structure, which frame, however, may be variously changed to suit the paddle wheel to different types of vessels.

Mounted in journal bearings in the end posts 3 at one end of the main frame is a shaft 4 which may constitute the main driving shaft of the structure. Adjacent to the posts 3 at the other end of the main frame are posts 5 loosely carried by the frame and provided with journal bearings for another shaft 6. Extending between the posts 3 at the opposite ends of the frame are intermediate beams 7 one on each side of the main frame, and these beams terminate adjacent to the post 5 in recesses 8 through which the shaft 6 extends. The shafts 4 and 6 carry sprocket wheels 9 near the sides of the main frame, there being two pairs of sprocket wheels with those of one pair alining with those of the other on the two shafts. Each pair of sprocket wheels carries a sprocket chain 10 and the sprocket chains in engagement with the respective sprocket wheels are kept sufficiently taut by means of wedges 11 introduced between the posts 5 and the neighboring posts 3, these wedges also serving to take up wear when such occurs.

Carried by the posts 3 near the bottom portion of the frame and on opposite sides thereof are guide strips 12 for a purpose which will presently appear. Extending between and fast to the cross pieces 2 at about the longitudinal mid line of the frame is a strip 13 carrying two guide beams 14, 15, respectively. The guide beam 14 terminates at one end in a return curve portion 16 and the guide strip 15 terminates at the opposite end in a similar return curved portion 17. The guide beams 14 and 15 are connected to the strip 13 near opposite ends by bolts 18, there being one bolt for each beam and arranged near opposite ends of the main frame, each bolt being made fast to the respective beam and extending through an elongated slot 19 in the strip 13. The two beams 14 and 15 are secured together in side to side relation by bolts 20 extending through both beams and fast in one and also passing through slots 21 in the other beam. This arrangement holds the beams together and to the main frame, but permits longitudinal adjustment of the beams with relation to each other, so that their curved ends 16 and 17 may be adjusted toward or from each other for a purpose which will presently appear. At points between the beams 14 and 15 and corresponding sides of the main frame are guide strips 22 having curved ends 23 with the curvature corresponding to the curvature of the inner walls of the ends 16 and 17. The strips 22 are located somewhat lower and are somewhat shorter than the inner walls or edges of the beams 14 and 15.

The sprocket chain 10 is composed of links 24 and pins 25 joining the links except that at certain intervals the pins 25 are replaced by pintles or trunnions 26 on the opposite ends of paddle blades 27. The pintles 26 are of sufficient length to extend entirely across a respective chain and beyond the latter where the pintle has a squared termination 28, or is otherwise shaped to receive a rocker bar 29, which may be held to the pintle by a screw 30 and washer 31, or in any other suitable manner.

To form a journal bearing for the pintle 26 there is provided an elongated block 32 having reduced ends 33 and constituting a roller which at the reduced ends 33 receive the links 24 of the chain 10. The block or roller 32 therefore serves as a carrier and journal support for the ends of a blade 27 without subjecting the pintles or trunnions of the blade to any strains to which the chain is subjected, wherefore the blade is at all times free to turn in its journal bearings, so far as such journal bearings are concerned. Moreover, the rollers or blocks 32 serve as friction reducing means between the chain and the sprocket wheels carrying it and between the chain and the paddle blades carried by it.

The bars 29 are disposed at opposite ends of the blades and project beyond the corresponding opposite faces of the chains, so as to be in the path of the strips 12, which latter may be in the form of channels receiving and guiding the bars 29 when traveling with the lower run of the chain.

When the paddles are traveling with the upper runs of the chain, they are supported near their pintle ends by the strips 22 and near their middle portions are borne upon by the beams 14 and 15. The coactive relation of the beams 14 and 15 and the strips 22 causes the blades to assume a level position or to become feathered. As the chains pass around the sprocket wheels the blades travel with them, and the curved extremities 16 and 17 of the beams 14 and 15 cause the blades to still hold their relation to the chain but to approach or leave the water edgewise, the blades dipping in the lower run of the chains in the water. When, however, the bars 29 reach the strips 12 they are presented thereto in such manner that they are constrained to assume a flat position on the strips 12 and they are so related to the blades 27 that when the bars 29 are flat upon the strips 12, the blades are presented flat toward the water instead of edgewise, and so as the blades progress through the water their flat faces are presented to the water and the paddles serve to propel the vessel carrying them but feather both on entering and leaving the water, so as to offer the least possible resistance to such movements.

Each blade is entirely free and unobstructed throughout its length, and is not weakened in any way by the removal of any of its parts, wherefore the structure is particularly strong. The movements of the blade about its longitudinal axis, so as to be presented flatwise against the water, and to feather to facilitate the leaving and entering of the water, are due entirely to guide strips acting upon the blade itself and upon devices carried by the blades exterior to the bodies of the blades.

The arms 29 project on opposite sides of the pintles and form particularly rigid means for holding the blades in their active position while traveling through the water. The guide devices for feathering the blades and maintaining them in the feathered position also serve to support the upper runs of the chains with the blades thereon. In the commercial embodiment of the structure the blades or paddles are, of course, relatively large and heavy structures, while the chain may be relatively much less bulky and considerably less bulky in proportion than the showing of the drawing. By the employment of the intermediate guides for supporting the upper run of the chain and controlling the feathering of the blades, the structure need only be made wide enough to accommodate the bars 29, by means of which the feathering is performed, and which further serve, together with the strips 12, to support the lower runs of the chains, the paddles or blades serving to connect and correspondingly support the lower runs of the chain so that they do not drop or sag.

As the blades travel along the upper run of the paddle wheel they are supported flatwise upon the strips 22 and are held thereto underneath the beams 14 and 15 by the latter. On reaching the forward curved portion or extension 16 of the beam 14, if the vessel is being propelled toward the left as viewed in Fig. 1, the paddle blades 27 begin to turn so that their forward edges are presented downwardly and this turning is sufficient to cause the paddle to enter the water edgewise in the direction in which the blade is traveling. Thus as the rocker bars 29 reach the guide strips 12, the propeller blades are held in an upright or active position causing the vessel to be propelled through the water. When the active run of the propeller blades is finished, the lower edge of each blade engages the extension 17 of the beam 15, assuming such extension to be toward the stern of the boat when the latter is moving through the water. Said extension 17 causes the propeller blade to turn as it rises through the water so as to be presented edge on to the water during the rising movement so that the edge of the blade which is the forward edge in the direction of rising from the water, is the opposite edge to that which entered the water at the forward end of the propeller wheel and this edge is forward as the blade travels between the guide strips 22 and the beams 14 and 15 toward the front of the propeller wheel. The result is that each blade makes a complete revolution about its longitudinal axis at each complete course of a propeller blade along the propeller wheel.

What is claimed is:—

1. A propeller for vessels, comprising an endless series of blades or paddles, endless sprocket chains carrying the blades or paddles, spaced sprocket wheels carrying the chains and providing means whereby power may be applied to drive the propellers, arms at the ends of the propeller blades beyond the chains, guide strips for the arms engaging them along the lower runs of the chains, guides in the path of the propeller blades or paddles between the chains and under-riding and supporting the upper run of the blades, and other guides over-riding and engaging the upper run of the blades, and provided with an extension dropping downwardly in the path of the blades where entering and leaving the lower run thereof whereby the blades are feathered in their course and each blade is caused to turn progressively on its longitudinal axis during successive circuits of the propeller.

2. A propeller for vessels, comprising an endless series of blades or paddles, and means for causing the feathering of the paddles, including guide members engaging the paddles on entering and leaving the water, the guide members engaging the paddles on leaving the water being in the path of the lower portion of each paddle to turn the latter to present that edge forwardly which is opposite from the edge entering the water.

3. A propeller for vessels, comprising an endless series of propeller blades or paddles each rotating about an axis longitudinal of the paddle, guides with down turned ends under-riding and supporting the upper run of the paddles, and guiding means over-riding the upper run of the paddles and provided with downward end extensions curved toward each other at their lower extremities and stopping at a lower level than the downwardly directed ends of the first named guides, whereby each paddle entering the water is constrained to enter the water edgewise in the direction of travel of the paddle, and on leaving the water is constrained to present the upper edge forwardly in the direction of travel of the blade out of the water and the paddle is thereby caused to rotate progressively about its longitudinal axis during successive circuits of the paddle wheel.

4. A propeller for vessels, comprising an endless series of blades or paddles each mounted to rotate about an axis longitudinal of the paddle, and each paddle being provided with guiding arms, the endless series of paddles having upper and lower runs, guides in the path of the lower run of the arms, guides under-riding and supporting the upper run of the paddles, and other guides over-riding the upper run of the paddles and comprising connected, oppositely adjustable beams with depending curved extensions having terminal portions in the path of the paddles at the extremities of their lower run, whereby the paddles of the upper run are constrained to lie flatwise in the direction of their travel and the paddles on entering and leaving the water are caused to have the edge leaving the water opposite to the edge entering the water.

In testimony that I claim the foregoing as my own, I have hereto affixed my signature in the presence of two witnesses.

LEE PERKINS BIGGERS.

Witnesses:
C. N. KILGORE,
TOBE MANSFIELD.